(12) United States Patent
Powell

(10) Patent No.: US 7,032,951 B2
(45) Date of Patent: Apr. 25, 2006

(54) CONVERTIBLE VEHICLE TOP STACK MECHANISM

(75) Inventor: James C. Powell, Sterling Heights, MI (US)

(73) Assignee: ASC. Incorporated, Southgate, MI (US)

( * ) Notice: Subject to any disclaimer, the term of this patent is extended or adjusted under 35 U.S.C. 154(b) by 95 days.

(21) Appl. No.: 10/787,839

(22) Filed: Feb. 26, 2004

(65) Prior Publication Data

US 2005/0189781 A1 Sep. 1, 2005

(51) Int. Cl.
*B60J 10/10* (2006.01)

(52) U.S. Cl. ............... 296/107.01; 296/107.09; 296/117

(58) Field of Classification Search ......... 296/107.01, 296/117, 107.09
See application file for complete search history.

(56) References Cited

U.S. PATENT DOCUMENTS

| | | | |
|---|---|---|---|
| 2,895,764 A | 7/1959 | Himka et al. | |
| 3,994,524 A | 11/1976 | Lehmann | |
| 4,948,194 A | 8/1990 | Dogliani | |
| 5,026,110 A * | 6/1991 | Koop et al. | 296/108 |
| 5,042,868 A | 8/1991 | Nothaft et al. | |
| 5,067,768 A * | 11/1991 | Fischbach | 296/117 |
| 5,096,251 A | 3/1992 | Pfertner et al. | |
| 5,219,200 A | 6/1993 | Orth et al. | |
| 5,225,747 A | 7/1993 | Helms et al. | |
| 5,267,769 A | 12/1993 | Bonne et al. | |
| 5,620,226 A | 4/1997 | Sautter, Jr. | |
| 5,749,619 A * | 5/1998 | Mentink | 296/117 |
| 5,772,274 A | 6/1998 | Tokarz | |
| 5,816,644 A * | 10/1998 | Rothe et al. | 296/117 |
| 5,971,470 A | 10/1999 | May et al. | |
| 6,039,382 A | 3/2000 | Mather et al. | |
| 6,048,021 A * | 4/2000 | Sautter, Jr. | 296/107.09 |
| 6,257,649 B1 | 7/2001 | Andersson et al. | |
| 6,312,042 B1 * | 11/2001 | Halbweiss et al. | 296/108 |
| 6,347,827 B1 | 2/2002 | Maass | |
| 6,416,111 B1 | 7/2002 | Neubrand | |
| 6,454,342 B1 | 9/2002 | Heselhaus et al. | |
| 6,578,898 B1 * | 6/2003 | Rothe et al. | 296/107.07 |
| 6,619,720 B1 * | 9/2003 | Nicastri | 296/107.08 |
| 6,629,719 B1 * | 10/2003 | Sims | 296/107.09 |
| 6,695,385 B1 * | 2/2004 | Lange | 296/107.09 |
| 6,793,267 B1 * | 9/2004 | Hesselhaus | 296/107.08 |
| 6,871,899 B1 * | 3/2005 | Mandl et al. | 296/107.09 |
| 2002/0125731 A1 * | 9/2002 | Hasselgruber et al. | 296/107.01 |
| 2003/0038501 A1 * | 2/2003 | Heselhaus | 296/107.09 |
| 2003/0146642 A1 | 8/2003 | Mandl et al. | |

* cited by examiner

*Primary Examiner*—Kiran B. Patel
(74) *Attorney, Agent, or Firm*—Harness, Dickey & Pierce P.L.C.

(57) ABSTRACT

A convertible vehicle top stack mechanism includes a moveable rearmost roof bow and an actuator. In an other aspect of the present invention, a linkage assembly couples a rearmost roof bow to a side rail. A further aspect of the present invention employs a rotatable member or crank to drive a set of buggy links in order to raise and lower an active number five roof bow.

14 Claims, 7 Drawing Sheets

CONVERTIBLE VEHICLE TOP STACK MECHANISM

BACKGROUND AND SUMMARY OF THE INVENTION

The present invention relates generally to automotive vehicle convertible roofs and more particularly to a convertible vehicle top stack mechanism having an active rearmost roof bow.

Some traditional convertible roofs for automotive vehicles employ an active number five bow which can be selectively rotated from a nominal and generally horizontal position to a raised and generally vertical position in order to allow clearance for a moveable, rigid tonneau cover. Such a tonneau cover needs to be opened to allow convertible roof access for retraction into a storage compartment or boot well, and the tonneau cover is closed so the number five roof bow can sit on top of it when the convertible roof is fully raised. One such example is disclosed in U.S. Pat. No. 6,039,382 entitled "Folding Top for a Motor Vehicle" which issued to Mather et al., on Mar. 21, 2000, and is incorporated by reference herein.

Hydraulically driven buggy links have been used to move active number five roof bows in various of these conventional roof systems. Some exemplary U.S. patents disclosing these conventional constructions are: U.S. Pat. No. 5,816,644 entitled "Folding Top for a Convertible" which issued to Rothe et al. on Oct. 6, 1998; and U.S. Pat. No. 5,749,619 entitled "Motor Vehicle with Foldable Roof, and Foldable Roof for Such a Motor Vehicle" which issued to Mentink on May 12, 1998; both of these are incorporated by reference herein. It is noteworthy, however, that many traditional number five bow actuation systems have required undesirably high forces to operate which necessitates difficult to package, large and expensive hydraulic cylinders while increasing the chance of premature part failure. Furthermore, many of these traditional systems disadvantageously create undesirably fast acceleration of the number five bow during movement which can lead to premature part failure.

In accordance with the present invention, a convertible vehicle top stack mechanism includes a moveable rearmost roof bow and an actuator. In an other aspect of the present invention, a linkage assembly couples a rearmost roof bow to a side rail. A further aspect of the present invention employs a rotatable member or crank to drive a set of buggy links in order to raise and lower an active number five roof bow. Yet another aspect of the present invention employs an automatic actuator which has an elongated dimension generally parallel to a rear side rail of a top stack mechanism.

The convertible vehicle top stack mechanism of the present invention is advantageous over traditional constructions in that the present invention reduces the activation forces required to move a rearmost roof bow relative to a side rail while also reducing acceleration spikes during movement of the rearmost roof bow. The present invention is further advantageous by providing a more modularized and integrated package for the top stack mechanism to facilitate and ease assembly of same into an automotive vehicle body. For example, the automatic actuator is preassembled to the top stack mechanism prior to shipment to the customer's final assembly plant such that a portion of the actuator does not need to be subsequently fastened to the automotive vehicle body. Accordingly, the present invention reduces part failure during usage, is easier to control, and is simpler to package and install in the vehicle. Additional advantages and features of the present invention will become apparent from the following description and appended claims, taken in conjunction with the accompanying drawings.

DETAILED DESCRIPTION OF THE PREFERRED EMBODIMENT

Figure 1:
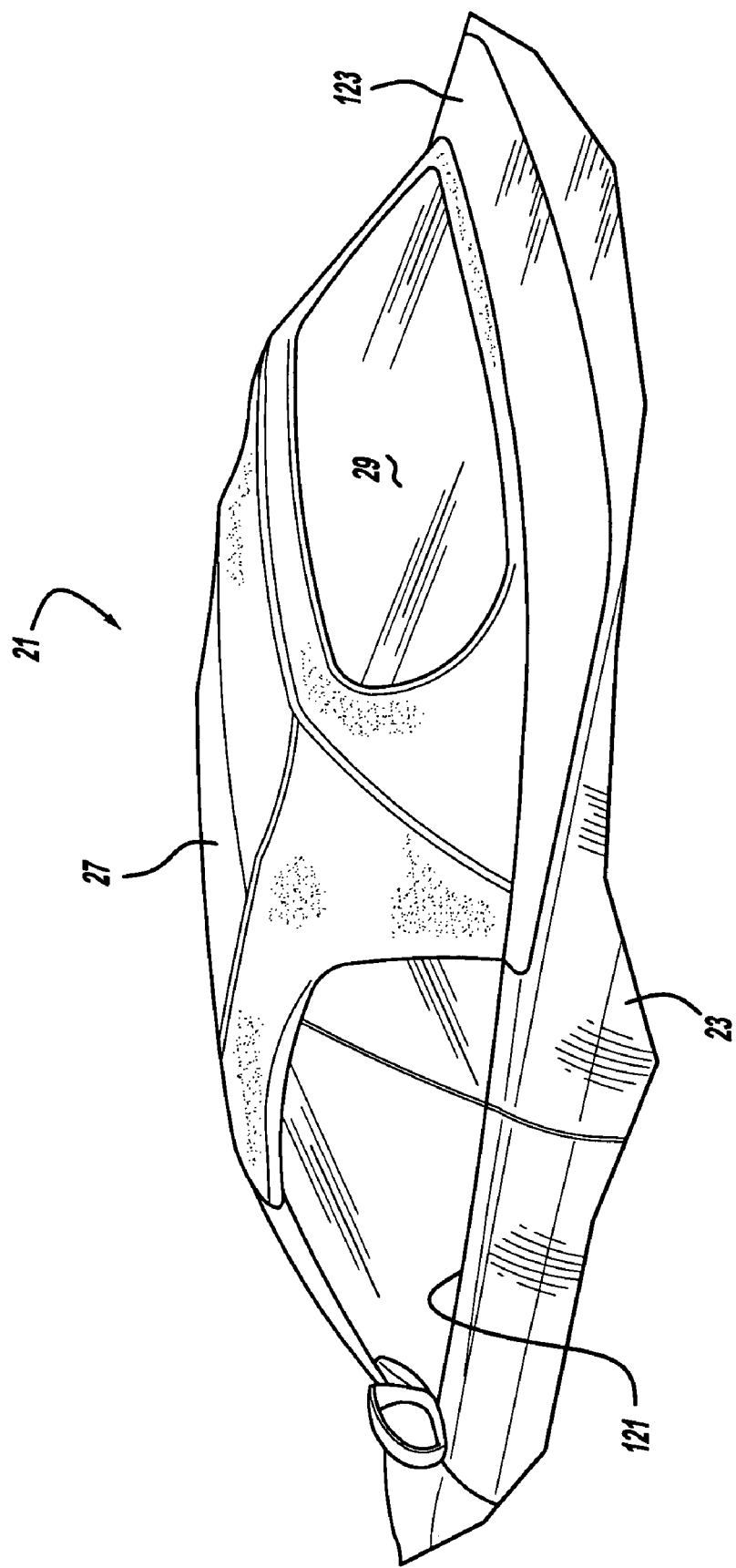
FIG. 1 is a perspective view showing the preferred embodiment of an automotive vehicle convertible roof of the present invention, in a fully raised position.
Figure 2:
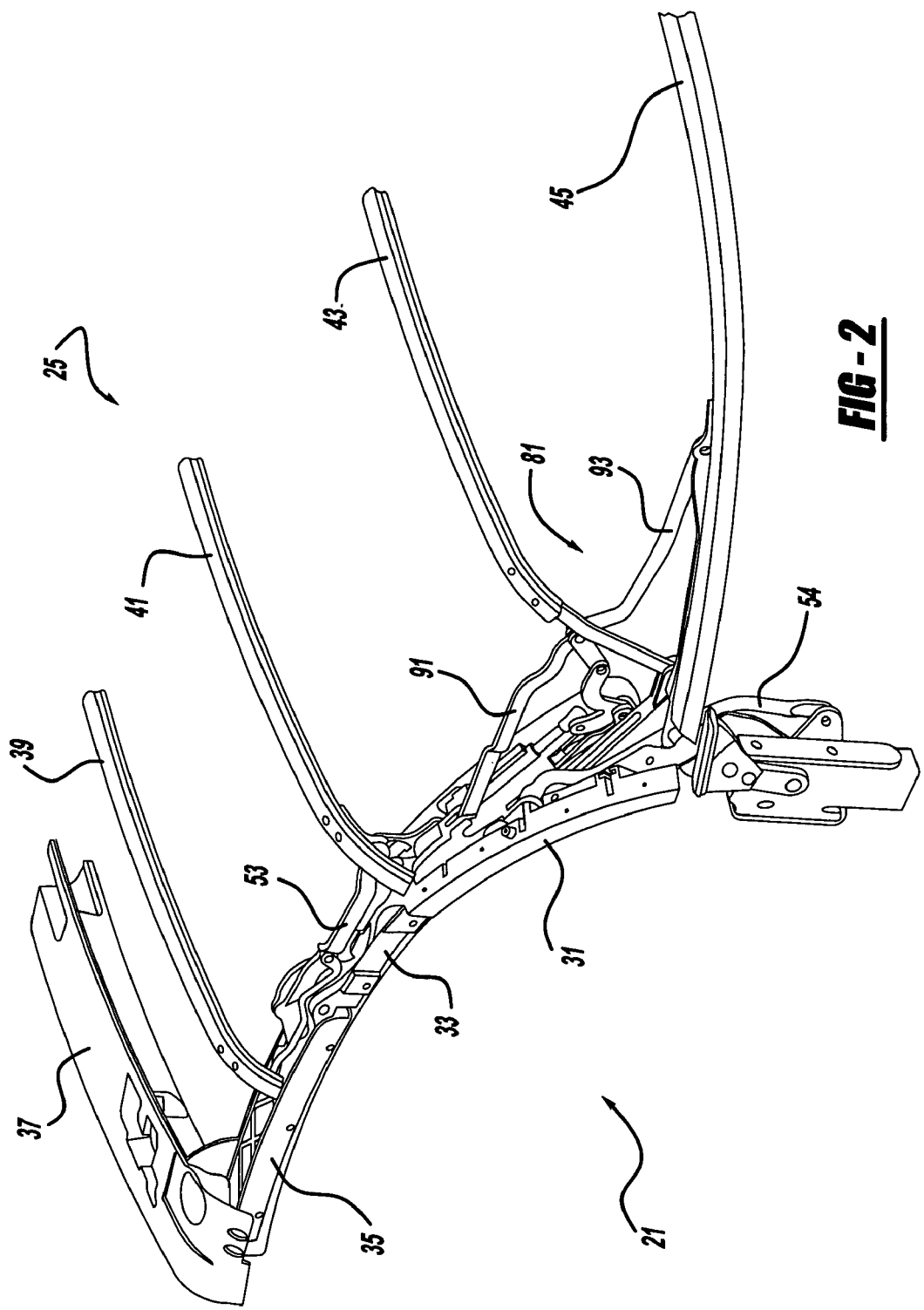
FIG. 2 is a fragmentary perspective view showing the preferred embodiment automotive vehicle convertible roof, in a fully raised position.

The preferred embodiment of a convertible roof 21 attached to an automotive vehicle body 23 of the present invention is shown in FIGS. 1 and 2. Only one side of convertible roof 21 will be discussed herein since the other side is essentially a mirrored image of the one discussed and illustrated. Convertible roof 21 includes a top stack mechanism 25 which is covered by a pliable or flexible fabric cover 27 which has a solid glass back window or backlite 29, or alternately a flexible PVC window, attached thereto.

Top stack mechanism 25 includes a rear side rail 31, a center side rail 33 and a front side rail 35. A forwardmost or number one roof bow 37 is attached to front side rail 35, a number two roof bow 39 is pivotally coupled to center side rail 33, a number three roof bow 41 is pivotally coupled to rear side rail 31 and a number four roof bow 43 is also pivotally coupled to rear side rail 31. A rearmost or number five roof bow 45 has a mounting bracket 47 affixed thereto, thereby defining an assembly, which is pivotally coupled at a pivot 51 to an offset extension 49 rearwardly projecting from a lower portion of rear side rail 31. Top stack mechanism 25 also includes various additional links 53 and 54, and a primary top stack actuator 55, such as a hydraulic cylinder or alternately, an electric motor. Primary actuator 55 moves the convertible roof between a fully raised and closed position covering a passenger compartment of the vehicle, to a fully retracted and open position within a roof storage compartment or boot well.

Figure 3:
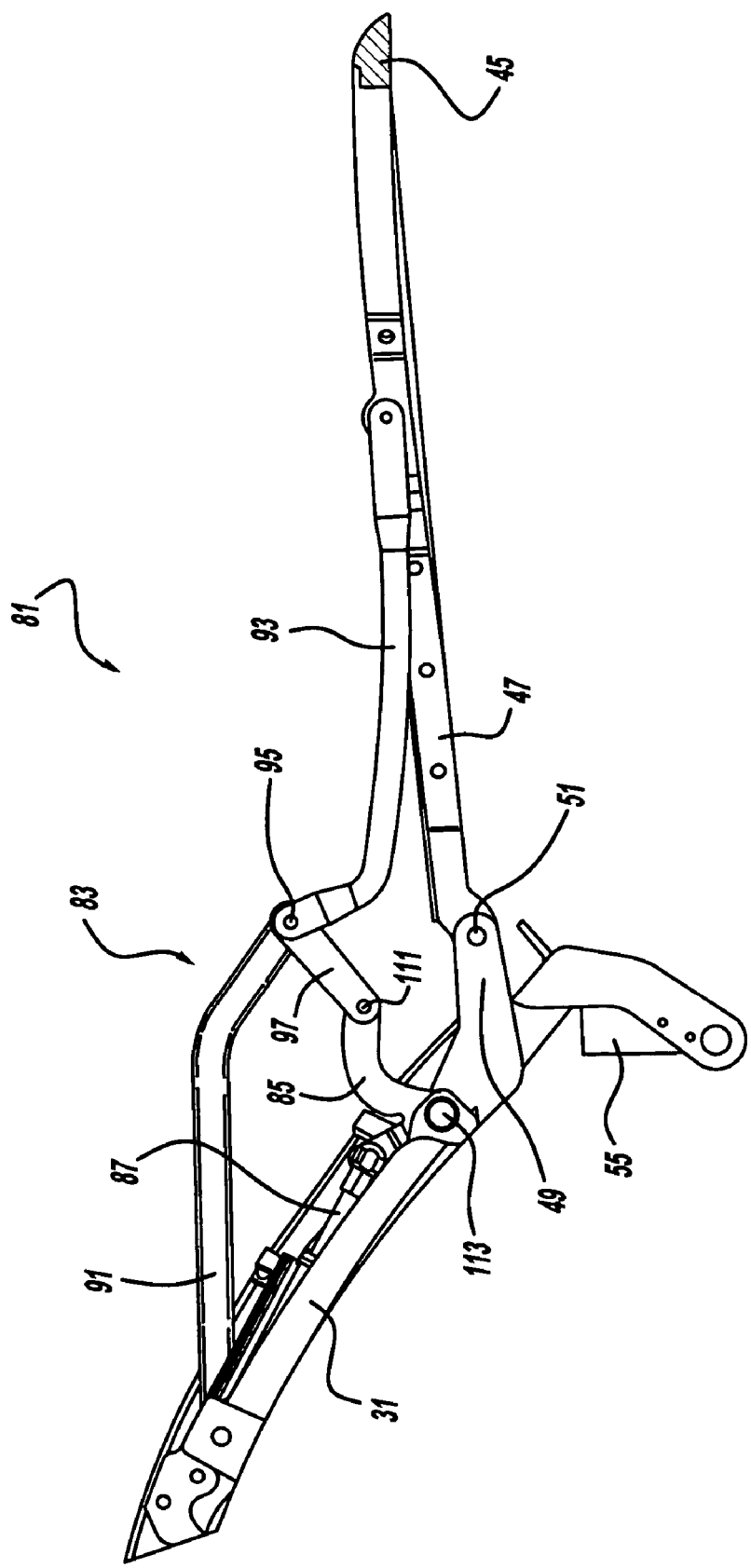
FIG. 3 is a side elevational view showing a portion of the preferred embodiment automotive vehicle convertible roof.
Figure 6:
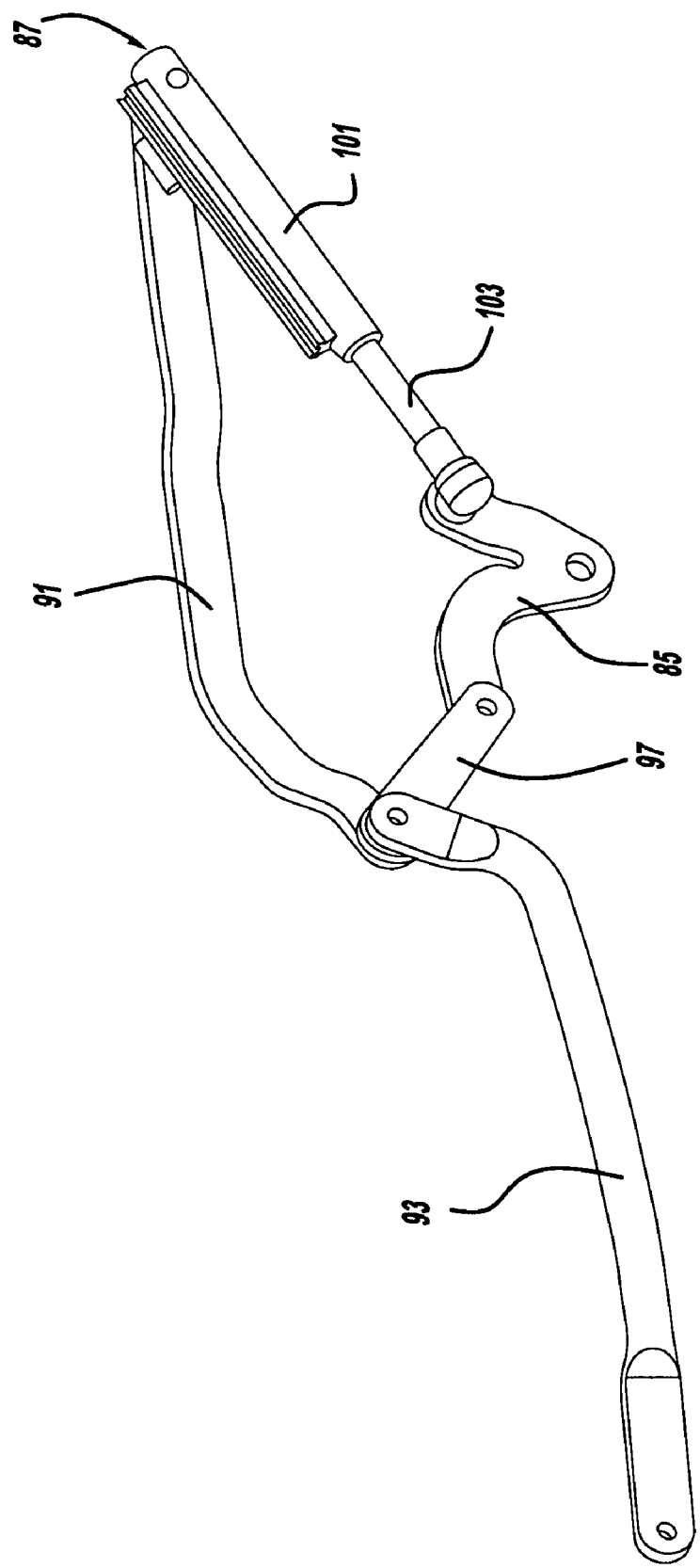
FIG. 6 is a perspective view showing a portion of the preferred embodiment automotive vehicle convertible roof.
Figure 7:
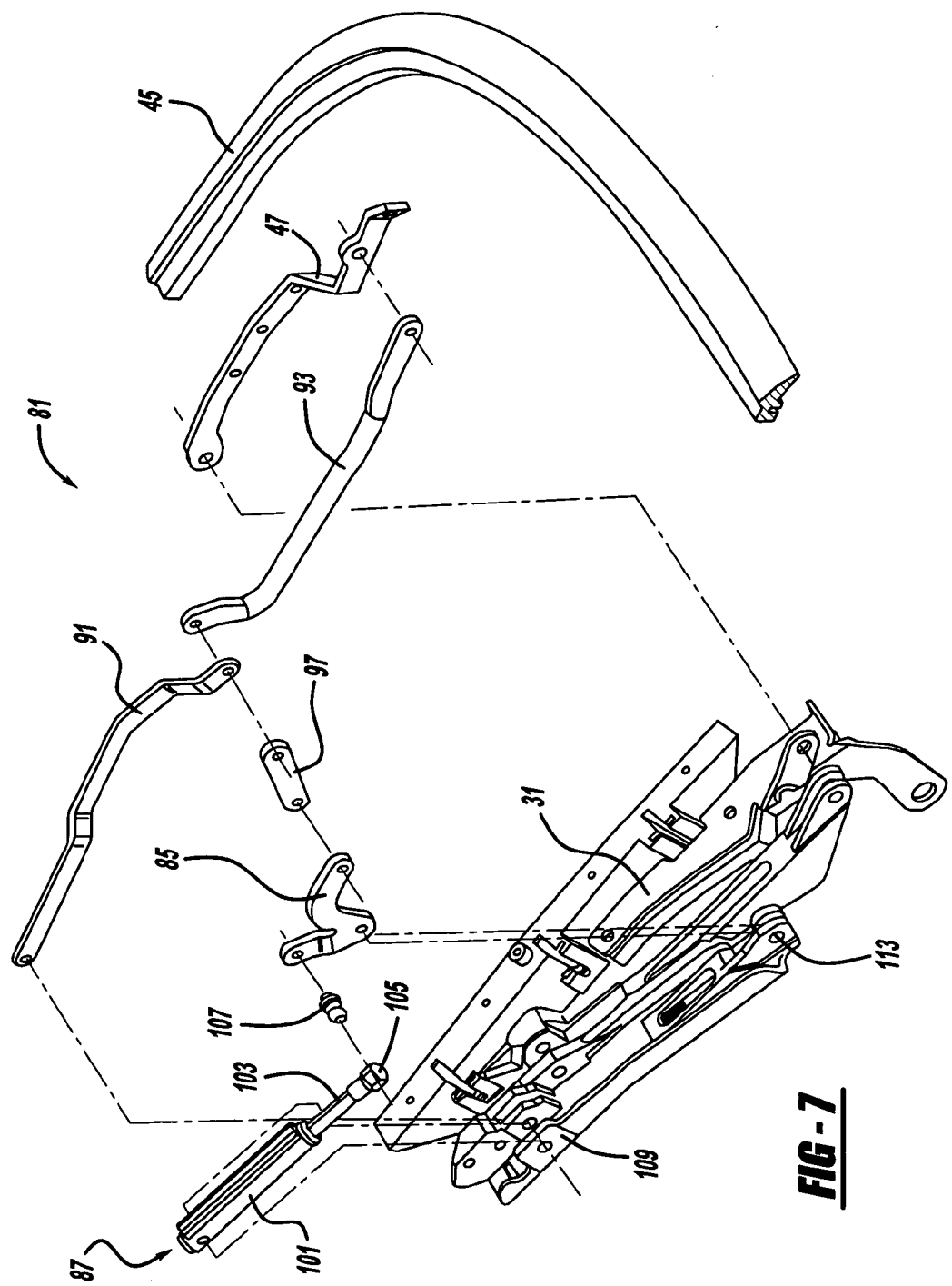
FIG. 7 is an exploded, perspective view showing a portion of the preferred embodiment automotive vehicle convertible roof.

Referring now to FIGS. 3, 6 and 7, a five bow actuation assembly 81 includes a buggy link assembly 83, a bell crank 85 and an automatic actuator 87. Buggy link assembly 83 includes a front buggy link 91, a rear buggy link 93 pivotally coupled to front buggy link 91 at a pivot joint 95, and a driving, upper mini link 97. Driving link 97 has a first end pivotally coupled to bell crank 85 at pivot 111 and an opposite, second end pivotally coupled at joint 95. A forward end of front buggy link 91 is rotatably coupled to rear side rail 31 and a rearmost end of rear buggy link 93 is rotatably coupled to number five roof bow 45. Bell crank 85 has a generally V-shape and is further attached to a set of flanges 5 of rear side rail 31 at pivot 113.

Actuator 87 includes a hydraulic fluid powered cylinder 101 within which is disposed a movable piston coupled to an elongated piston rod 103. A ball receptacle 105 is affixed to an end of piston rod 103 for rotatable engagement journaled about a ball stud 107 which is mounted to arm of bell crank 85. The opposite end of cylinder 101 is rotatably mounted within a pair of flanges 109 of rear side rail 31.

Figure 4:
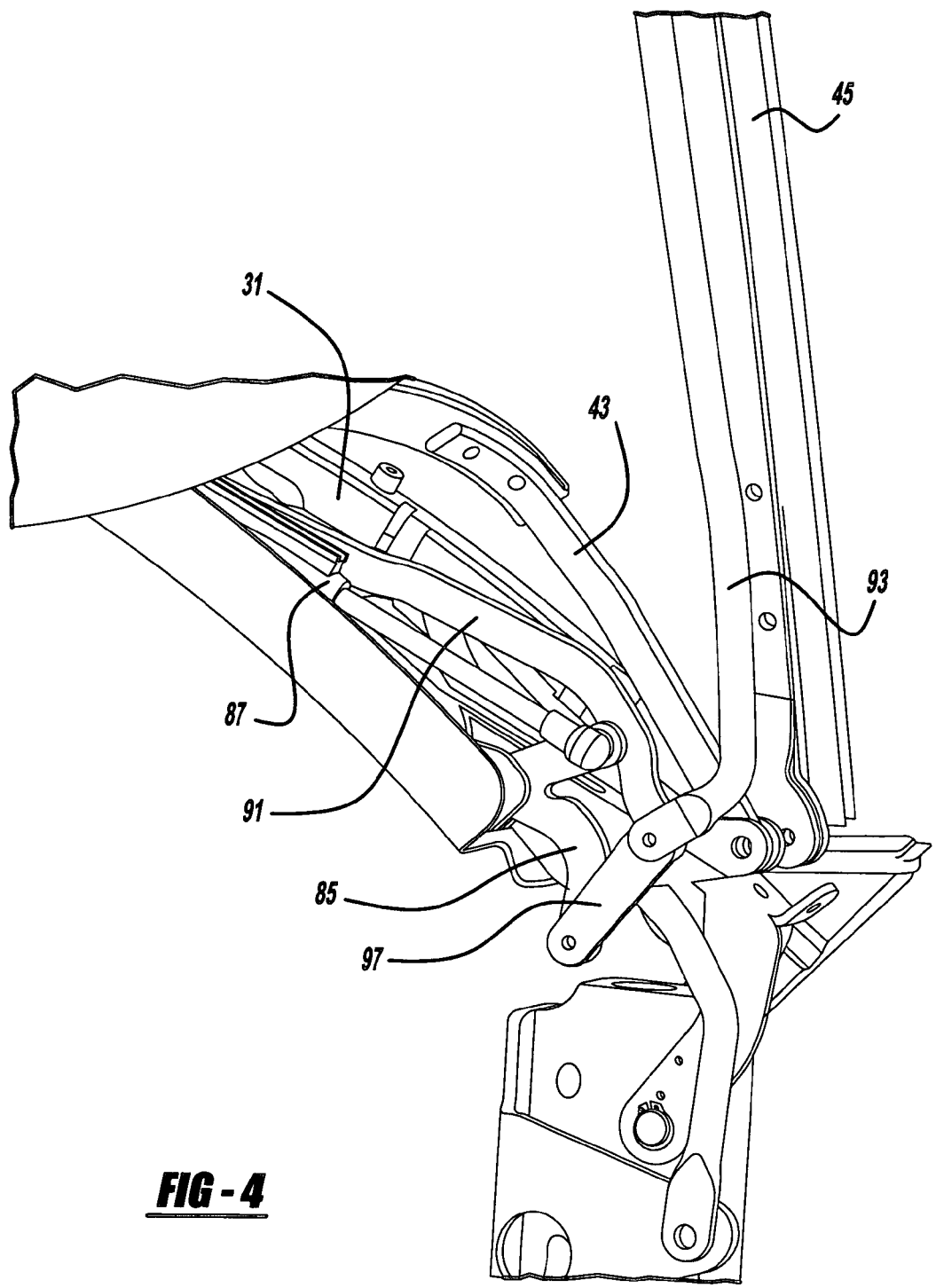
FIG. 4 is an enlarged and fragmentary, perspective view showing a portion of the preferred embodiment automotive vehicle convertible roof, with a number five roof bow in a raised position.
Figure 5:
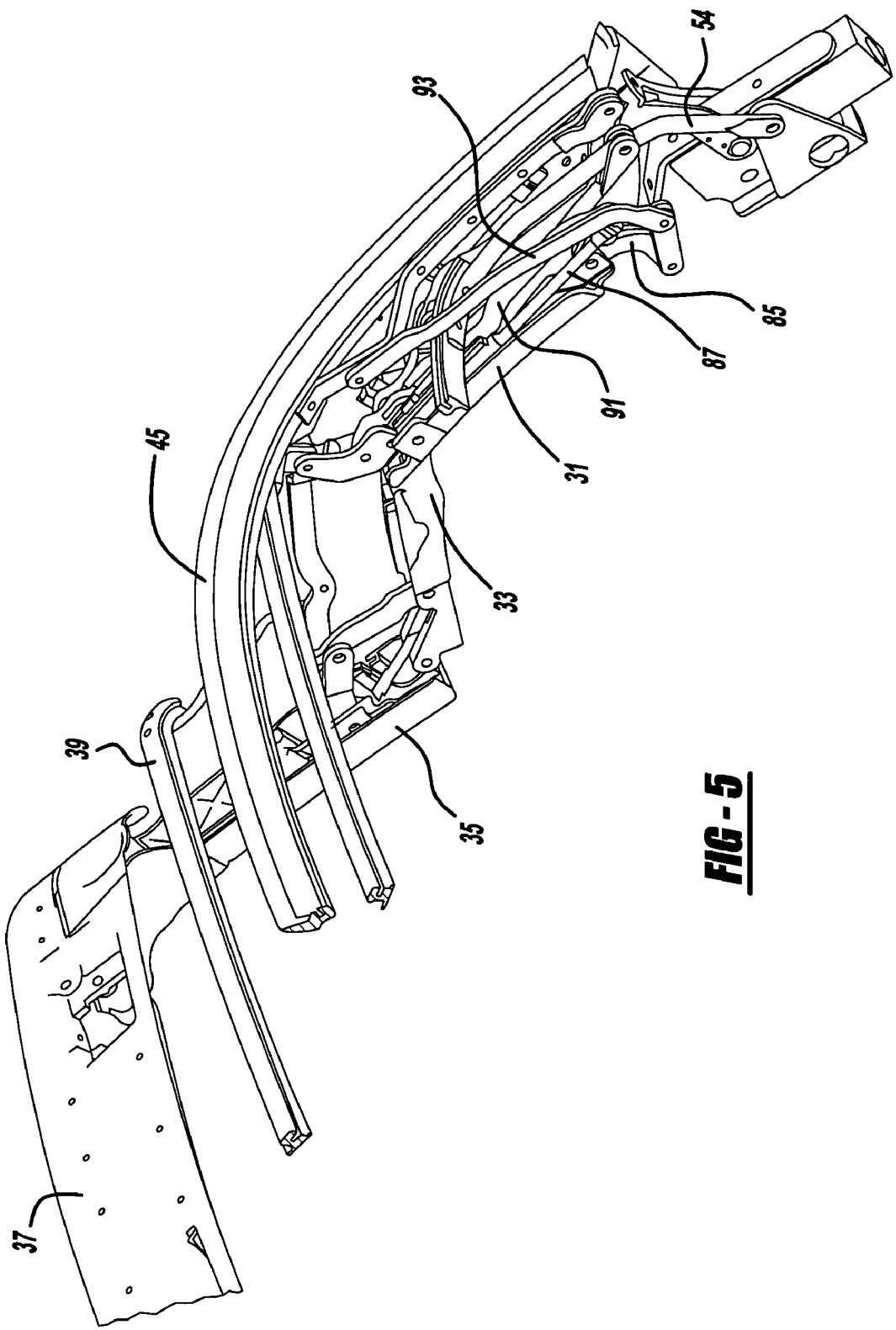
FIG. 5 is a fragmentary perspective view showing the preferred embodiment automotive vehicle convertible roof with the number five roof bow in a raised position and the remainder of a top stack mechanism in a partially retracted position.

Front and rear buggy links 91 and 93, respectively, are located in an over-center and extended orientation when the convertible roof is fully raised and the number five roof bow is in its nominal position essentially at a belt line 121 of the vehicle where it is positioned on top of an exterior surface of a movable and rigid tonneau cover 123. This orientation is best illustrated in FIGS. 1 and 3. Advancing of piston rod 103 relative to hydraulic cylinder 101 serves to rotate bell crank 85 toward number five roof bow 45 which, in turn, rotates and downwardly pulls driving link 97 in order to collapse buggy links 91 and 93 downward and away from their over-center condition. Accordingly, this actuation motion automatically rotates number five bow 45 in an upward direction toward a generally vertical and raised position as is shown in FIGS. 4 and 5. Tonneau cover 123 (see FIG. 1) can simultaneously or subsequently be upwardly pivoted about a rear pivot axis, or alternately rearwardly slid above a trunk lid, to allow open access of the convertible roof for subsequent retraction and storage into the roof storage compartment. It is noteworthy that an elongated axis of actuator 87 is generally parallel to rear side rail 31 when the convertible top is fully raised and the number five bow is in its nominal position as shown in FIG. 3. This allows for more compact and aesthetically pleasing packaging of components, due in part, to the reduced size of the cylinder.

While the preferred embodiment of the convertible top stack mechanism has been disclosed, it should be appreciated that variations may be employed which fall within the scope of the present invention. For example, a movable trunk lid can be used in place of the disclosed tonneau cover. Furthermore, the top stack mechanism may be covered in whole or in part by multiple, substantially rigid, hard-top panel members in place of or in addition to a pliable cover, although all of the disclosed advantages may not be fully achieved. Moreover, additional linkages of varying shapes and locations may be employed with the present invention, although all of the disclosed advantages may not be fully achieved. It is also envisioned that electromagnetic devices can be used in place of the disclosed hydraulic actuator. Furthermore, the rearmost roof bow can be a number four, number six or other roof bow members depending upon the specific vehicle characteristics. While certain materials and shapes have been disclosed, it should be appreciated that various other shapes and materials and shapes can be employed. It is intended by the following claims to cover these and any other departures from the disclosed embodiments which fall within the true spirit of this invention.

The invention claimed is:

1. An automotive vehicle convertible roof comprising:
   a rearmost roof bow;
   a side roof rail;
   a soft top roof cover attached to the rearmost roof bow and the side roof rail;
   a linkage assembly coupling the rearmost roof bow to the side rail;
   a crank rotatably coupled to the side roof rail; and
   an actuator having a first end coupled to and moveable with the side roof rail, and a second end of the actuator being coupled to the crank;
   the actuator operably rotating the crank which moves the linkage assembly which, in turn, moves the rearmost roof bow relative to the side rail.

2. The convertible roof of claim 1 wherein:
   the linkage assembly includes a front buggy link, a rear buggy link and a driving link;
   a first end of the front buggy link is coupled to the side rail;
   a first end of the rear buggy link is coupled to the rearmost roof bow;
   second ends of the buggy links are coupled to each other; and
   the driving link is coupled to at least one of the buggy links.

3. The convertible roof of claim 2 wherein:
   a first end of the driving link is coupled to the buggy links where the front buggy link is coupled to the rear buggy link;
   the crank is directly coupled to the driving link; and
   the linkage assembly is movable to an over-center orientation.

4. The convertible roof of claim 1 wherein the crank is a bell crank having a fixed pivot mounted to the side rail between the entire actuator and a pivotal connection between the rearmost roof bow and the side rail.

5. The convertible roof of claim 4 wherein at least a majority of the actuator is located above a vehicular belt line when the side rail is in a raised position and an elongated axis of the actuator is substantially parallel to the side rail when the side rail is in the raised position.

6. The convertible roof of claim 1 wherein
   the rearmost roof bow a number five roof bow which is operably raised and lowered even when the side rail is substantially stationary;
   the side rail is a rear side rail which is pivotally coupled to the number five roof bow; and
   the actuator including a hydraulic cylinder being elongated in a direction substantially parallel to an elongated direction of the rear side rail when the rear side rail and number five roof bow are fully extended in a covering orientation.

7. An automotive vehicle convertible roof comprising:
   a rearmost roof member movable from a nominal position to a raised position;
   a pliable roof cover attached to the rearmost roof member;
   a rear side rail moveable from a raised position to a retracted position;
   a buggy linkage assembly including a first link coupled to the side rail and a second link coupled to the rearmost roof member, the first and second links being coupled to each other at a joint;
   a driving link rotatably coupled to the buggy linkage assembly adjacent the joint; and
   an actuator operably moving the driving link which rotates the buggy linkage assembly and causes the rearmost roof member to move between its nominal and raised positions, a majority of the actuator being located above a vehicular belt line when the side rail is in its raised position;

the actuator having an elongated axis located substantially parallel to the side rail when the side rail is in its raised position, at least a majority of the actuator moving with the side rail.

8. The convertible roof of claim 7 wherein the rearmost roof member is a number five bow assembly, and the number five bow assembly is directly pivotally connected to the rear side rail.

9. The convertible roof of claim 7 wherein the buggy linkage assembly is movable to an over-center condition and at least one of the first and second links has an arcuately shaped segment.

10. The convertible roof of claim 7 further comprising a bell crank having a pivot mounted to the side rail and the crank operably moving the driving link.

11. The convertible roof of claim 10 wherein the crank has a substantially V-shape with a first arm rotatably connected to a piston rod of the actuator and the second arm rotatably connected to the driving link, the point of the V-shape facing substantially downwardly when the rearmost roof member is in its nominal position and the side rail is in its raised position.

12. The convertible roof of claim 7 wherein:
the rearmost roof member is a roof bow which is operably raised and lowered even when the side rail is substantially stationary;
the rear side rail is pivotally coupled to the roof bow; and
the actuator includes a hydraulic cylinder.

13. The convertible roof of claim 7 wherein the buggy linkage assembly only consists of the first and second links, the first link being directly connected to the side rail by a fixed pivot and the second link being directly connected to the rearmost roof member by a fixed pivot.

14. The convertible roof of claim 7 further comprising a number four roof bow coupled to the rear side rail, a back window attached to the pliable cover between the number four roof bow and the rearmost roof member, and a rigid tonneau cover located below the rearmost roof member when the rearmost roof member is in its nominal position, the rearmost roof member being moveable to its raised position to allow clearance for movement of the tonneau cover.

* * * * *